(12) United States Patent
Zhao et al.

(10) Patent No.: US 10,084,661 B2
(45) Date of Patent: Sep. 25, 2018

(54) METHOD FOR EVALUATING PERFORMANCE OF A DATA COMMUNICATION NETWORK

(71) Applicant: Macau University of Science and Technology, Taipa (MO)

(72) Inventors: Qinglin Zhao, Taipa (MO); Rongchang Duan, Taipa (MO); Hanwen Zhang, Taipa (MO); Yujun Zhang, Taipa (MO); Zhongcheng Li, Taipa (MO)

(73) Assignee: Macau University of Science and Technology, Taipa, Macau (CN)

( * ) Notice: Subject to any disclaimer, the term of this patent is extended or adjusted under 35 U.S.C. 154(b) by 79 days.

(21) Appl. No.: 15/416,035

(22) Filed: Jan. 26, 2017

(65) Prior Publication Data
US 2018/0212836 A1    Jul. 26, 2018

(51) Int. Cl.
*H04W 24/00* (2009.01)
*H04W 84/18* (2009.01)
(Continued)

(52) U.S. Cl.
CPC ........ *H04L 41/142* (2013.01); *H04L 43/0888* (2013.01); *H04W 4/005* (2013.01); *H04W 4/70* (2018.02)

(58) Field of Classification Search
CPC .. H04L 41/142; H04L 43/0888; H04W 4/005; H04W 4/70
See application file for complete search history.

(56) References Cited

U.S. PATENT DOCUMENTS 6,820,042 B1 * 11/2004 Cohen ................... H04L 41/145
702/179
7,668,105 B1 * 2/2010 Zimmerman ........... H04L 43/50
370/241
(Continued)

OTHER PUBLICATIONS

Y. Sun, et al., "RI-MAC: A Receiver-Initiated Asynchronous Duty Cycle MAC Protocol for Dynamic Traffic Loads in Wireless Sensor Networks," In Proceedings of the 6th ACM Conference on Embedded Network Sensor Systems, pp. 1-14, ACM, 2008.
(Continued)

*Primary Examiner* — Afsar M Qureshi
(74) *Attorney, Agent, or Firm* — Renner, Kenner, Grieve, Bobak, Taylor & Weber Co., LPA

(57) ABSTRACT

A method for evaluating performance of a data communication network with a receiver node arranged to initiate data transmission thereto from a plurality of transmitter nodes directly connected therewith includes applying to the data communication network a stochastic operation model arranged to model operation characteristics of the receiver node, and determining throughput or power consumption of the network based on the stochastic operation model. The operation characteristics include: a duration of a work cycle of the receiver node ($T_{cycle}$), the work cycle including an active data communication period ($T_{hold}$) and an inactive period ($T_{dwell}$); a duration of the active data communication period ($T_{hold}$), the active data communication period including a number of data communication events; the number of data communication events in the work cycle n; a duration of the respective data communication events ($T_{tx}$); and amount of data successfully received at the receiver node in the work cycle ($B_i$).

20 Claims, 10 Drawing Sheets

Applying a stochastic operation model to the data communication network (302)

Determining throughput or power consumption of the data communication network based on the stochastic operation model (304)

(51) Int. Cl.
  *H04L 12/24* (2006.01)
  *H04W 4/00* (2018.01)
  *H04L 12/26* (2006.01)
  *H04W 4/70* (2018.01)

(56) References Cited

U.S. PATENT DOCUMENTS

| | | | | |
|---|---|---|---|---|
| 9,544,215 | B2* | 1/2017 | Yin | H04W 24/04 |
| 9,934,340 | B2* | 4/2018 | Naito | G06F 17/5009 |
| 2003/0148765 | A1* | 8/2003 | Ma | H04W 36/32 |
| | | | | 455/438 |
| 2003/0210680 | A1* | 11/2003 | Rao | H04L 41/147 |
| | | | | 370/352 |
| 2016/0295435 | A1* | 10/2016 | Baroudi | H04W 4/70 |

OTHER PUBLICATIONS

L. Tang, et al., "PW-MAC: An Energy-Efficient Predictive-Wakeup MAC Protocol for Wireless Sensor Networks," In INFOCOM, 2011 Proceedings IEEE, pp. 1305-1313, IEEE, 2011.

L. Tang, et al., "Em-Mac: A Dynamic Multichannel Energy-Efficient MAC Protocol for Wireless Sensor Networks," In Proceedings of the Twelfth ACM International Symposium on Mobile Ad Hoc Networking and Computing, p. 23, ACM, 2011.

M. Buettner, et al., X-MAC: A Short Preamble MAC Protocol for Duty-Cycled Wireless Sensor Networks, In Proceedings of the 4th International Conference on Embedded Networked Sensor Systems, pp. 307-320, ACM, 2006.

W. Ye, et al., "An Energy-Efficient MAC Protocol for Wireless Sensor Networks," In INFOCOM 2002, Twenty-First Annual Joint Conference of the IEEE Computer and Communications Societies, Proceedings IEEE, vol. 3, pp. 1567-1576, IEEE, 2002.

F. Nait-Abdesselam, et al., "O-MAC: An Organized Energy-Aware MAC Protocol for Wireless Sensor Networks," 2007 IEEE International Conference on Communications, pp. 3648-3653, IEEE, 2007.

G. Bianchi, "Performance Analysis of the IEEE 802.11 Distributed Coordination Function," IEEE Journal on Selected Areas in Communications, vol. 18, No. 3, Mar. 2000, pp. 535-547.

S. Pollin, et al., "Performance Analysis of Slotted Carrier Sense IEEE 802.15.4 Medium Access Layer," IEEE Transactions on Wireless Communications, vol. 7, No. 9, Sep. 2008, pp. 3359-3371.

J. Zhang, et al., "Performance Analysis of an Energy Efficient MAC Protocol for Sensor Networks," In 2008 International Symposium on Parallel Architectures, Algorithms, and Networks, (i-span 2008), pp. 254-259, IEEE, 2008.

M. Y. Donmez, et al., "Combined Analysis of Contention Window Size and Duty Cycle for Throughput and Energy Optimization in Wireless Sensor Networks," Computer Networks, vol. 57, No. 5, 2013, pp. 1101-1112.

O. Yang, et al., "Modeling and Performance Analysis for Duty-Cycled MAC Protocols with Applications to S-MAC and X-MAC," IEEE Transactions on Mobile Computing, vol. 11, No. 6, Jun. 2012, pp. 905-921.

Q. Zhao, et al., "Modeling Nonsaturated IEEE 802.11 DCF Networks Utilizing an Arbitrary Buffer Size,." IEEE Transactions on Mobile Computing, vol. 10, No. 9, 2011, pp. 1248-1263.

N. Gupta, et al., "Performance Evaluation of IEEE 802.11 DCF in Single Hop Ad Hoc Networks," Wireless Personal Communications, vol. 79, No. 3, 2014, pp. 2171-2193.

F. Tong, et al., "A Pipelined-Forwarding, Routing-Integrated and Effectively Identifying MAC for Large-Scale WSN," In Proc. IEEE GLOBECOM, 2013, pp. 225-230.

F. Tong, et al., "Modeling and Analyzing Duty-Cycling Pipelined-Scheduling MAC for Linear Sensor Networks," IEEE Transactions on Vehicular Technology, vol. 65, No. 4, 2016, pp. 2608-2620.

X. Fafoutis, et al., "Receiver-Initiated Medium Access Control Protocols for Wireless Sensor Networks," Computer Networks, 76 (2015) pp. 55-74.

L. Xu, et al., "Optimizing Energy Efficiency for Minimum Latency Broadcast in Low-Duty-Cycle Sensor Networks", ACM Transactions on Sensor Networks (TOSN), vol. 11, No. 4, Article 57, Jul. 2015, pp. 57:1-57:31.

\* cited by examiner

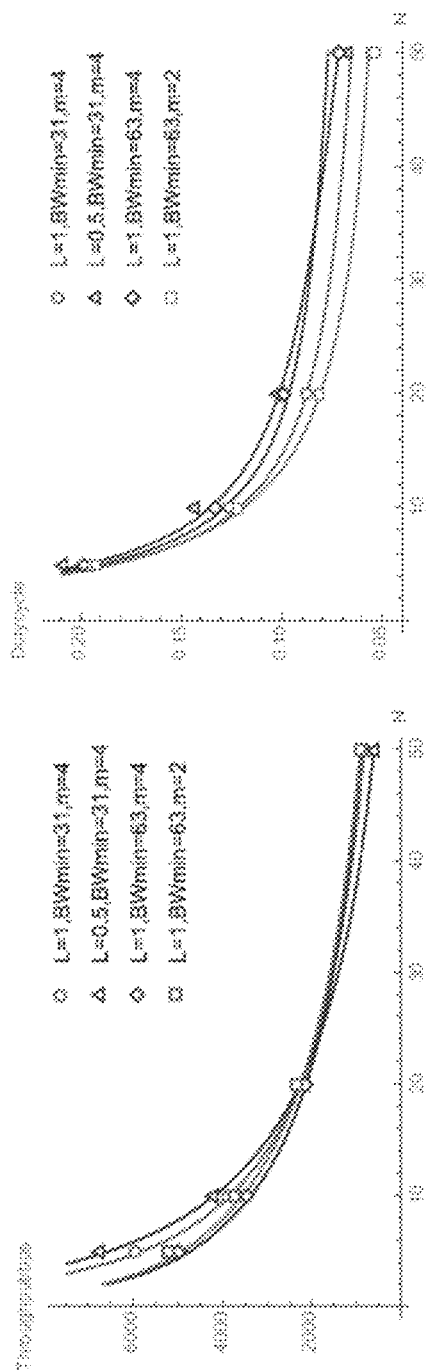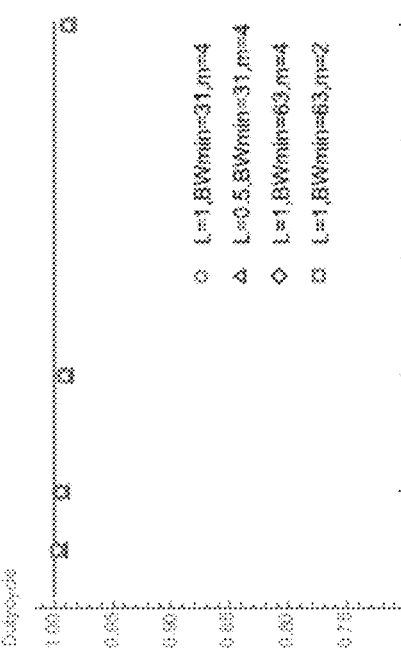
FIGURE 7A
FIGURE 7B
FIGURE 7C

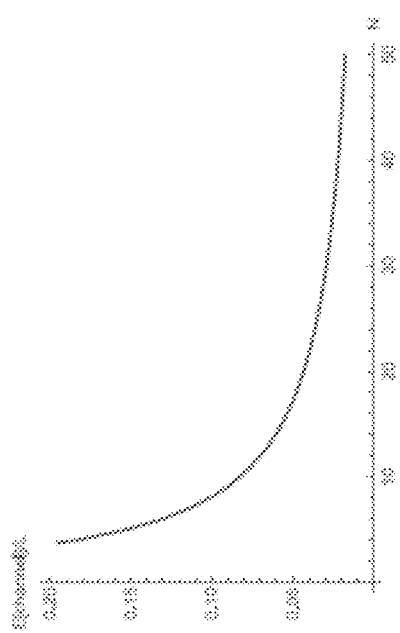
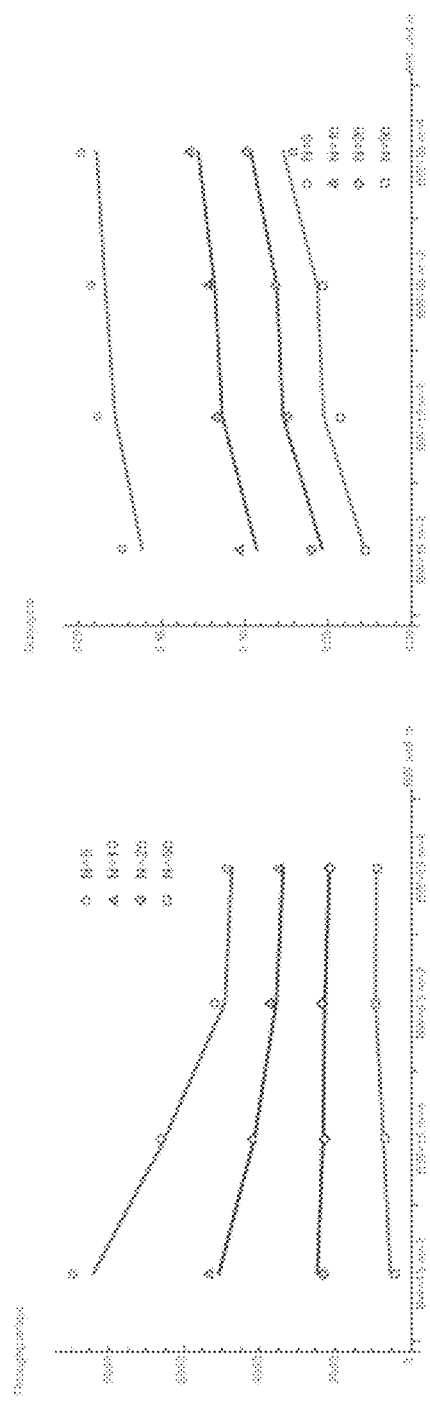

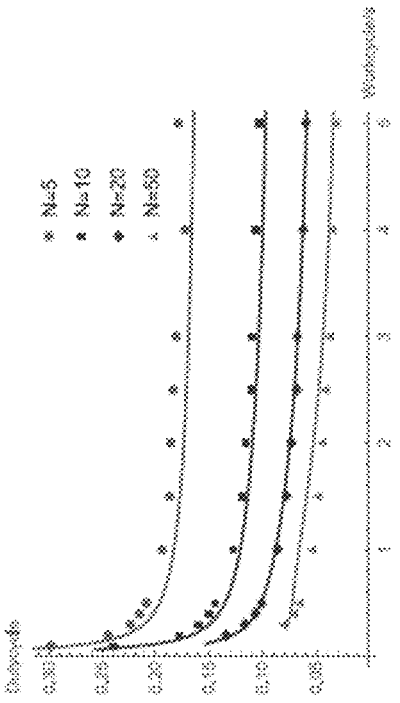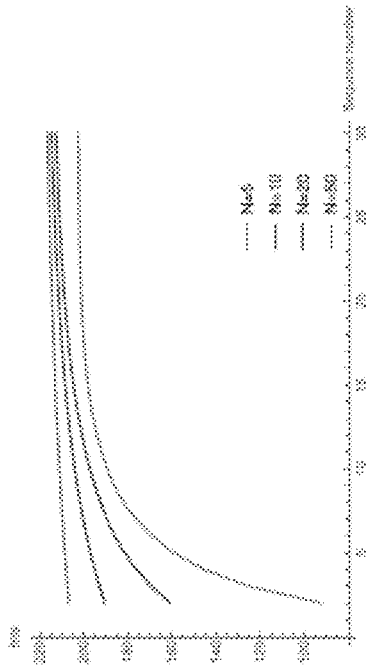
FIGURE 10A FIGURE 10B
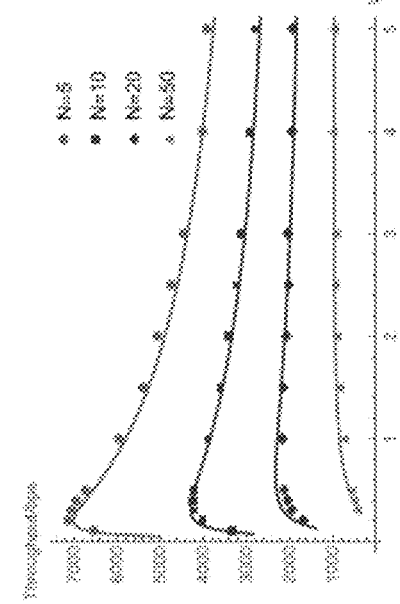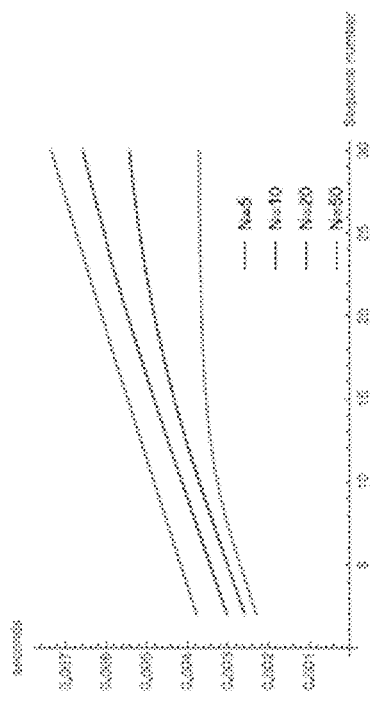
FIGURE 11A FIGURE 11B

METHOD FOR EVALUATING PERFORMANCE OF A DATA COMMUNICATION NETWORK

TECHNICAL FIELD

The present invention relates to a method for evaluating performance of a data communication network and particularly, although not exclusively, to a method for measuring system throughput and power consumption for a wireless sensor network that operates based on receiver-initiated medium access control protocol.

BACKGROUND

A data communication network, e.g., a wireless sensor network, generally includes multiple data communication nodes operably connected with each other for communicating data. Depending on the operation cycle, each data communication nodes may act as a sender operable to transmit data to neighboring nodes and as a receiver operable to receive data from neighboring nodes. Typically, these sensor networks are controlled through medium access control (MAC) protocols that can be classified into two categories, sender-initiated MAC and receiver-initiated MAC.

In sender-initiated MAC, the senders are responsible for controlling data communication. Each sender independently chooses a window size and competes with other senders for access to the channels of the receiver. The performance of sender-initiated MAC can be analysed based on the decoupling assumption adopted in the well-known Bianchi model of 802.11 networks.

Unlike sender-initiated MAC, in receiver-initiated MAC, it is the receiver that initiates data transmission for all intended senders, and the senders compete for channel access based on the same back-off windows controlled by the receiver. Compared with sender-initiated MAC, receiver-initiated MAC is more energy efficient and is capable of delivering heavy traffic loads, and so it has recently received a great deal of attention. Despite its advantages, one problem associated with receiver-initiated MAC is that its performance is rather difficult to evaluate. This is because the decoupling assumption that can be used for evaluating sender-initiated MAC is not applicable for analyzing performance of receiver-initiated MAC.

There is a need to better assess the performance of receiver-initiated MAC through theories and simulations to facilitate development of receiver-initiated MAC.

SUMMARY OF THE INVENTION

In accordance with a first aspect of the present invention, there is provided a method for evaluating performance of a data communication network with a receiver node arranged to initiate data transmission thereto from a plurality of transmitter nodes directly connected therewith, the method comprising: applying a stochastic operation model to the data communication network, wherein the stochastic operation model is arranged to model operation characteristics of the receiver node, the operation characteristics include: a duration of a work cycle of the receiver node ($T_{cycle}$), wherein the work cycle includes an active data communication period ($T_{hold}$) and an inactive period ($T_{dwell}$); a duration of the active data communication period ($T_{hold}$), wherein the active data communication period includes a number of data communication events; the number of data communication events in the work cycle n; a duration of the respective data communication events ($T_{tx}$); and amount of data successfully received at the receiver node in the work cycle ($B_t$); determining throughput or power consumption of the data communication network based on the stochastic operation model. The duration of one work cycle is the sum of the duration of the active data communication period ($T_{hold}$), the duration of the inactive period ($T_{dwell}$), and the duration of an off period (when the receiver node goes to sleep). The duration of the active data communication period is the sum of the duration of all n data communication events plus the duration of a beacon transmission event ($T_{beacon}$). Each data communication events includes a beacon transmission event ($T_{beacon}$), a wait event ($T_{wait}$), and a data receive or collision event ($T_{Data}$). In other words, the duration of each data communication event is the sum of the duration of the beacon transmission event ($T_{beacon}$), the duration of the wait event ($T_{wait}$), and the duration of the data receive or collision event ($T_{Data}$).

In one embodiment of the first aspect, the stochastic operation model is further arranged to model a correlation of the data communication events in a work cycle.

In one embodiment of the first aspect, the correlation of the data communication events in the work cycle is modeled using a 1-D Markov chain.

In one embodiment of the first aspect, the data communication events each includes a respective beacon transmission event, a wait event, and a data receive or collision event.

In one embodiment of the first aspect, a duration of the wait event in a subsequent data communication event is increased compared to a duration of the wait event in an immediately previous data communication event when a data collision event occurs in the immediately previous data communication event; and the duration of the wait event is below an upper limit.

In one embodiment of the first aspect, the correlation of the data communication events in a work cycle is associated with a correlation of durations of the wait events in the work cycle In one embodiment of the first aspect, the step of applying the stochastic operation model further comprises the steps of: determining an expected value of a duration of the respective data communication events in a work cycle ($E[T_{tx}^i]$); and determining an expected value of amount of data successfully received during the respective data communication events ($E[B^i]$).

In one embodiment of the first aspect, the step of applying the stochastic operation model further comprises the step of determining an expected value of a duration of the active data communication period ($E[T_{hold}]$) based on a cumulative distribution function of the duration of the active data communication period ($T_{hold}$).

In one embodiment of the first aspect, the step of applying the stochastic operation model further comprises the step of determining an expected value of the number of data communication events in a work cycle (n) based on the expected value of a duration of the active data communication period ($E[T_{hold}]$).

In one embodiment of the first aspect, the step of applying the stochastic operation model further comprises the step of determining an expected value a duration of the inactive period in a work cycle ($E[T_{dwell(n+1)}]$).

In one embodiment of the first aspect, the step of applying the stochastic operation model further comprises the step of determining an expected value of a duration of a work cycle of the receiver node ($E[T_{cycle}]$).

In one embodiment of the first aspect, the work cycle of each of the receiver node and the transmitter nodes are independent.

In one embodiment of the first aspect, the receiver node comprises a receiver or a transceiver operating in receiving mode; and the transmitter nodes comprise transmitters or transceivers operating in transmission mode.

In one embodiment of the first aspect, the receiver node and the plurality of transmitter nodes form a star topology in which data transmission terminates at the receiver node.

In one embodiment of the first aspect, the data communication network is a wireless sensor network operating under a receiver-initiated medium access control protocol.

In one embodiment of the first aspect, the throughput is determined by determining $E[\#]/E[T_{cycle}]$; where $E[\#]$ is an expected value of the amount of data successfully received at the receiver node in the work cycle, determined based on respective amount of data successfully received at the receiver node during respective data communication events in the work cycle; and $E[T_{cycle}]$ is an expected value of a duration of the work cycle of the receiver node.

In one embodiment of the first aspect, the power consumption is determined based on duty cycle of the receiver node.

In one embodiment of the first aspect, the duty cycle of the receiver node is determined by determining $$\frac{E[T_{hold}] + E[T_{dwell(n+1)}]}{E[T_{cycle}]};$$

where $E[T_{hold}]$ is an expected value of the active data communication period in the work cycle; $E[T_{dwell(n+1)}]$ is an expected value of the inactive period in the work cycle; and $E[T_{cycle}]$ is an expected value of the duration of the work cycle of the receiver node.

In accordance with a second aspect to the present invention, there is provided a system for evaluating performance for a data communication network with a receiver node arranged to initiate data transmission thereto from a plurality of transmitter nodes directly connected therewith, the system comprising: means for applying a stochastic operation model to the data communication network, wherein the stochastic operation model is arranged to model operation characteristics of the receiver node, the operation characteristics include: a duration of a work cycle of the receiver node ($T_{cycle}$), wherein the work cycle includes an active data communication period ($T_{hold}$) and an inactive period ($T_{dwell}$); a duration of the active data communication period ($T_{hold}$), wherein the active data communication period includes a number of data communication events; the number of data communication events in the work cycle n; a duration of the respective data communication events ($T_{tx}$); and amount of data successfully received at the receiver node in the work cycle ($B_i$); means for determining throughput or power consumption of the data communication network based on the stochastic operation model. The duration of one work cycle is the sum of the duration of the active data communication period ($T_{hold}$), the duration of the inactive period ($T_{dwell}$), and the duration of an off period (when the receiver node goes to sleep). The duration of the active data communication period is the sum of the duration of all n data communication events plus the duration of a beacon transmission event ($T_{beacon}$). Each data communication events includes a beacon transmission event ($T_{beacon}$), a wait event ($T_{wait}$), and a data receive or collision event ($T_{Data}$). In other words, the duration of each data communication event is the sum of the duration of the beacon transmission event ($T_{beacon}$), the duration of the wait event ($T_{wait}$), and the duration of the data receive or collision event ($T_{Data}$).

In accordance with a third aspect to the present invention, there is provided non-transient computer readable medium for storing computer instructions that, when executed by one or more processors, causes the one or more processors to perform a method for evaluating performance for a data communication network with a receiver node arranged to initiate data transmission thereto from a plurality of transmitter nodes directly connected therewith, the method comprising: applying a stochastic operation model to the data communication network, wherein the stochastic operation model is arranged to model operation characteristics of the receiver node, the operation characteristics include: a duration of a work cycle of the receiver node ($T_{cycle}$), wherein the work cycle includes an active data communication period ($T_{hold}$) and an inactive period ($T_{dwell}$); a duration of the active data communication period ($T_{hold}$), wherein the active data communication period includes a number of data communication events; the number of data communication events in the work cycle n; a duration of the respective data communication events ($T_{tx}$); and amount of data successfully received at the receiver node in the work cycle ($B_i$); determining throughput or power consumption of the data communication network based on the stochastic operation model. The duration of one work cycle is the sum of the duration of the active data communication period ($T_{hold}$), the duration of the inactive period ($T_{dwell}$), and the duration of an off period (when the receiver node goes to sleep). The duration of the active data communication period is the sum of the duration of all n data communication events plus the duration of a beacon transmission event ($T_{beacon}$). Each data communication events includes a beacon transmission event ($T_{beacon}$), a wait event ($T_{wait}$), and a data receive or collision event ($T_{Data}$). In other words, the duration of each data communication event is the sum of the duration of the beacon transmission event ($T_{beacon}$), the duration of the wait event ($T_{wait}$), and the duration of the data receive or collision event ($T_{Data}$).

BRIEF DESCRIPTION OF THE DRAWINGS

Embodiments of the present invention will now be described, by way of example, with reference to the accompanying drawings in which:

FIG. 7A is a graph showing theoretical results and simulation results of a relationship between the throughput of the data communication network and the number of senders in direct connection with the receiver in the data communication network, obtained using the model/method of FIG. 3;

FIG. 7B is a graph showing theoretical results and simulation results of a relationship between duty cycle of the receiver in the data communication network and the number of senders in direct connection with the receiver in the data communication network, obtained using the model/method of FIG. 3;

FIG. 7C is a graph showing theoretical results and simulation results of a relationship between duty cycle of the senders in direct connection with the receiver in the data communication network and the number of those senders in the data communication network, obtained using the model/method of FIG. 3;

FIG. 8 is a graph showing a relationship between an expected value of the duration of the active data communication period in the work cycle of the receiver in the data communication network per the average duration of the work cycle and the number of senders in direct connection with the receiver in the data communication network;

FIG. 9A is a graph showing theoretical results and simulation results of a relationship between throughput of the data communication network and back-off window (number and duration of wait period) associated with the receiver in the data communication network, for different number of senders in direct connection with the receiver in the data communication network, obtained using the model/method of FIG. 3;

FIG. 9B is a graph showing theoretical results and simulation results of a relationship between duty cycle of the receiver of the data communication network and back-off window (number and duration of wait period) associated with the receiver in the data communication network, for different number of senders in direct connection with the receiver in the data communication network, obtained using the model/method of FIG. 3;

FIG. 10A is a graph showing theoretical results and simulation results of a relationship between throughput of the data communication network and an average duration of a work cycle of the receiver in the data communication network, for different number of senders in direct connection with the receiver in the data communication network, obtained using the model/method of FIG. 3;

FIG. 10B is a graph showing theoretical results and simulation results of a relationship between duty cycle of the receiver of the data communication network and an average duration of a work cycle of the receiver in the data communication network, for different number of senders in direct connection with the receiver in the data communication network, obtained using the model/method of FIG. 3;

FIG. 11A is a graph showing a relationship between expected value of a duration of the $i\text{-}^{th}$ data communication event in a work cycle of the receiver in the data communication network and the sequence number i of the data communication event, for different number of senders in direct connection with the receiver in the data communication network, obtained using the model/method of FIG. 3;

FIG. 11B is a graph showing a relationship between expected value of successfully received bits of the $i\text{-}^{th}$ data communication event in a work cycle of the receiver in the data communication network and the sequence number i of the data communication event, for different number of senders in direct connection with the receiver in the data communication network, obtained using the model/method of FIG. 3.

DETAILED DESCRIPTION OF THE PREFERRED EMBODIMENT

Figure 1:
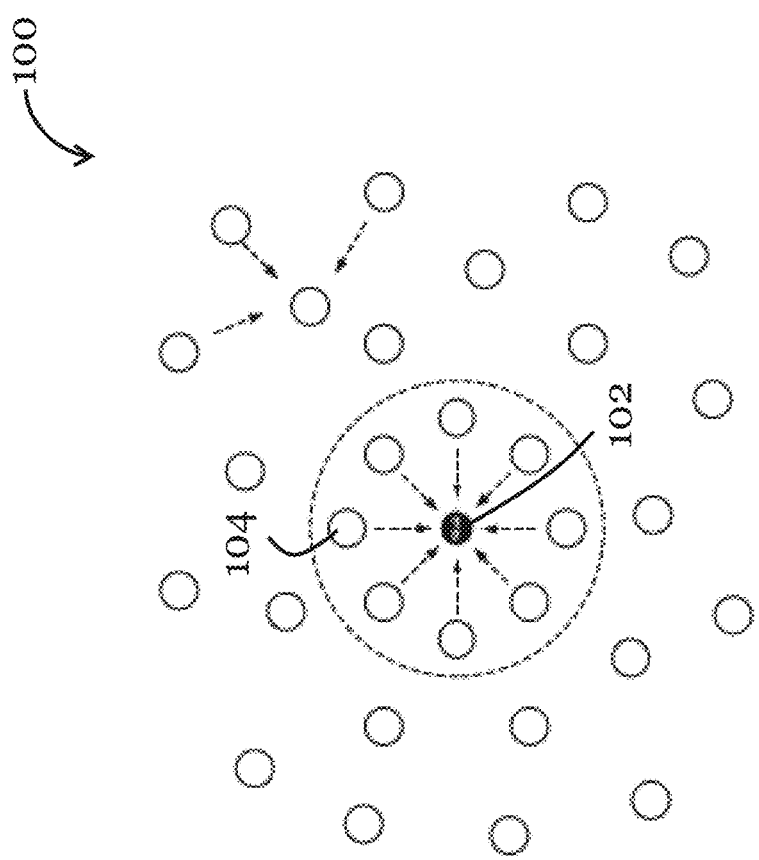
FIG. 1 is a schematic diagram illustrating a data communication network under the control of a receiver-initiated MAC.

FIG. 1 shows a data communication network 100 under the control of a receiver-initiated MAC (RI-MAC) in one embodiment of the present invention. In the present embodiment, the data communication network 100 is a wireless sensor network (WSN) with a star topology. The network includes multiple sender nodes 104 arranged around a receiver node 102 (also called "sink node"). In the network of FIG. 1, each sender node 104 is arranged to send data to the sink node 102 (as indicated by the arrows), step by step, so all data in the network would finally be aggregated in the sink node 102.

In RI-MAC, like that in the network 100 of FIG. 1, a node periodically goes to sleep and wakes up (e.g., by turning on and off its radio) for the purpose of saving power. An active node goes to sleep when it has neither data to receive nor data to send. An asleep node wakes up when it intends to send or to receive data. In RI-MAC, receivers initiate every transmission opportunity by broadcasting one or more beacons. When the neighboring senders receive a beacon from their common intended receiver, the senders compete for transmitting data to the receiver following the control of the receiver.

In RI-MAC, each node may periodically act as a receiver to check whether there is data intended to be transmitted it. If a node does not act as a receiver at a given moment, it acts as a sender when it has data to send, or it goes to sleep otherwise. In one example, a node becomes a receiver when the periodic scheduled wakeup instant of the node arrives (the node does not necessarily has to be asleep before that instant), no matter what mode (active or asleep) and role (receiver or sender) the node was at the previous moment. Preferably, the scheduled wakeup instant of each node is periodic.

In the present embodiment, the interval between two consecutive scheduled wakeup instants of a node is defined as work cycle, which is preferably a random variable that follows a uniform distribution over [a, b], U [a, b]. Every time when a node becomes a receiver, it sends a beacon. By sending a beacon, the receiver initiates a data transmission opportunity for its neighboring senders with pending data for it, and controls the competition among the senders. Once a data transmission event completes, it sends another beacon to initiate another data transmission opportunity. The receiver ceases to be a receiver when it does not receive a data frame from any senders. Then the receiver either turns into a sender (when it has data to send), or goes to sleep. As a consequence, in each work cycle, the receiver is able to initiate several successive data transmission events and to hold the channel (data transmission channel) for a certain period.

In the example of FIG. 1, the amount of data is great due to the large number of nodes in the network 100. Also, since the sink node 102 only directly receives data from its direct sender nodes 104, the saturation throughput of the sink node 102 in the star topology could represent the maximum throughput capability of the whole network, and hence may become the bottleneck in practice.

Operation of receiver and senders in such data transmission network will be described in further detail with reference to FIG. 2, which shows an exemplary receiver-initiated MAC.

Figure 2:
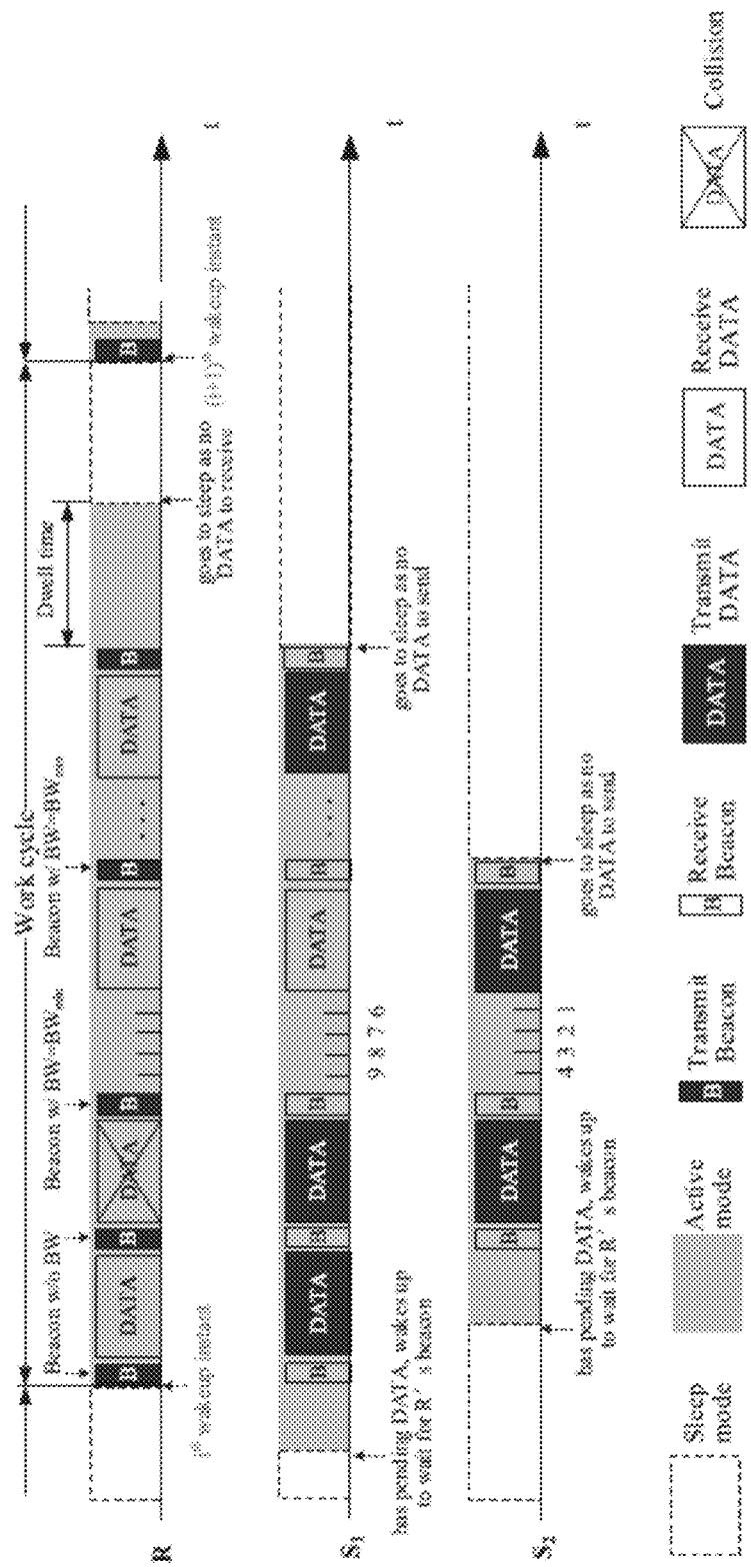
FIG. 2 is a schematic diagram illustrating operation of a receiver-initiated MAC in accordance with one embodiment of the present invention.

In FIG. 2, node R (may simply be referred to as "R") wakes up as a receiver at the beginning of its work cycle. Once the channel is idle after a scheduled wakeup instant, R broadcasts a beacon, announcing that it is ready to receive data. After sending a beacon, R senses the medium silently (e.g., waits for a response).

If R then successfully receives a data frame, it broadcasts another beacon in short inter-frame space (SIFS). This beacon not only acknowledges the receipt of the last data frame, but also initiates another data transmission opportunity intended for R.

Alternatively, if R senses channel activities but cannot decode a data packet, it may determine that a collision has occurred. Immediately after the end of the collision, R generates another beacon with back-off window (BW) field to initiate the next data transmission opportunity. BW indicates that senders should finish a random slot time back-off, ranging from 0 to a threshold value $BW_{max}$, before transmitting a data frame.

In any case, if R does not receive a data frame within the dwell time after broadcasting a beacon, R stops being a receiver. R then either goes to sleep (if it has no pending data frame to send); or it turns into a sender (if it has data frame to send). The dwell time of a beacon is defined as the max back-off duration, which is the BW value in the beacon multiply the slot time, plus an SIFS.

The receiver controls the competition processes between senders for transmission opportunities, by introducing BW field in beacons. The BW field requires each contending sender to finish an integer slot time back-off, which is uniformly chosen from [0, BW], before the next data frame transmission. In a preferred example, the BW value employs the binary exponential back-off (BEB) strategy. At the beginning of each work cycle, R broadcasts a beacon without BW, i.e., BW value is set to 0. If R does not detect a collision in a work cycle, R always broadcasts beacons without BW. However, if R detects a collision in a work cycle, R broadcasts beacons with a BW and the value of BW is set to W−1, where W is an integer variable. Initially, W−1 equals to $BW_{min}$ in a work cycle. Every time when R detects a collision in work cycle, it doubles the value of W, until W−1 reaches $BW_{max}$. Every time when R successfully receives a data frame or when W−1 is already at $BW_{max}$, R keeps the BW value of the next beacon unchanged.

In FIG. 2, a node $S_1$, $S_2$ wakes up from sleep as a sender when it has data to send. It waits silently for the beacon from its intended receiver, e.g., R. Upon receiving a beacon without BW from R, it sends a data frame immediately. Alternatively, upon receiving a beacon with BW field from R, it randomly chooses an integer back-off interval over the BW value. During the back-off, the sender keeps on sensing the channel.

If the sender senses activities in the channel apart from beacons from intended receivers, it terminates its current back-off and waits for the next beacon from any of its intended receivers.

Alternatively, if the sender senses beacons from any of its intended receivers, it terminates its current back-off and acts following the control of newly received beacon.

In another case, if sender successfully finishes its back-off, it sends a data frame to R.

After sending a data frame, the sender waits for the acknowledgment from R. Preferably, unacknowledged data frame would be retransmitted and, if the retransmission count of a data frame reaches a predefined retry limit, the data frame is dropped. The sender goes to sleep when it has no more pending data frame to send. Preferably, every time when the scheduled wakeup instant of a sender arrives, it switches to be a receiver. If it is communicating with a receiver (e.g., transmitting data to the receiver or waiting for acknowledgment from the receiver), it turns into receiver after the communication finishes. Otherwise, it immediately turns into receiver.

Figure 3:
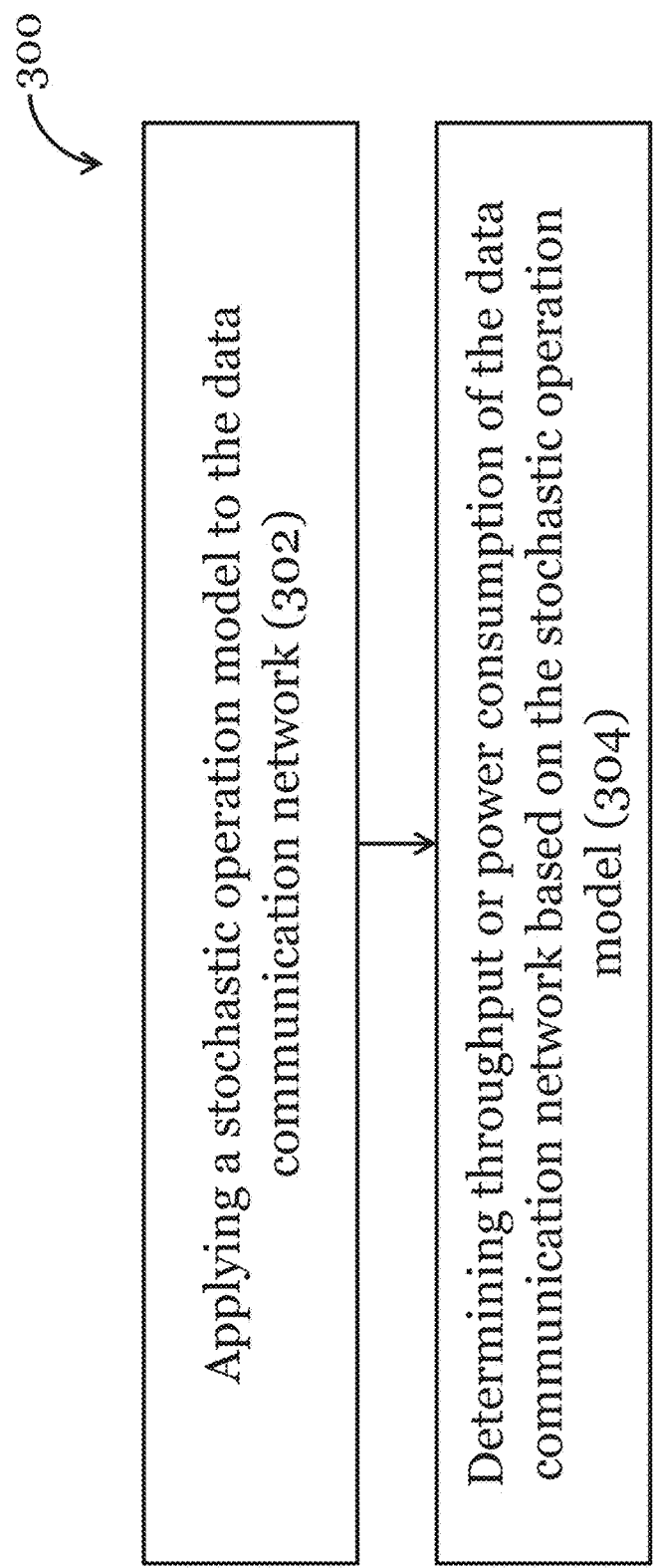
FIG. 3 is a flow chart illustrating a method for evaluating performance of a data communication network under the control of a receiver-initiated MAC based on an operation model in accordance with one embodiment of the present invention.

FIG. 3 shows a flow diagram illustrating a method 300 for evaluating performance of a data communication network with a receiver node arranged to initiate data transmission thereto from a plurality of transmitter nodes directly connected therewith. The method 300 may be applicable in the system of FIG. 1 or 2. The method comprising applying a stochastic operation model to the data communication network to model operation characteristics of the receiver node in step 302, and determining throughput or power consumption of the data communication network based on the stochastic operation model in step 304. In the present embodiment, the operation characteristics of the receiver node include: a duration of a work cycle of the receiver node ($T_{cycle}$), wherein the work cycle includes an active data communication period ($T_{hold}$) and an inactive period ($T_{dwell}$); a duration of the active data communication period ($T_{hold}$), wherein the active data communication period includes a number of data communication events; the number of data communication events in the work cycle n; a duration of the respective data communication events ($T_{tx}$); and amount of data successfully received at the receiver node in the work cycle (Bi). The duration of one work cycle is the sum of the duration of the active data communication period ($T_{hold}$), the duration of the inactive period ($T_{dwell}$), and the duration of an off period (when the receiver node goes to sleep). The duration of the active data communication period is the sum of the duration of all n data communication events plus the duration of a beacon transmission event ($T_{beacon}$). Each data communication events includes a beacon transmission event ($T_{beacon}$), beacon), a wait event ($T_{wait}$), and a data receive or collision event ($T_{Data}$). In other words, the duration of each data communication event is the sum of the duration of the beacon transmission event ($T_{beacon}$), the duration of the wait event ($T_{wait}$), and the duration of the data receive or collision event ($T_{Data}$). Preferably, the stochastic operation model is further arranged to model a correlation of the data communication events in a work cycle. Details of the method in FIG. 3 will be further described and verified below with reference to FIGS. 4 to 11B.

Modeling RI-MAC

The present embodiment provides model for RI-MAC based on the method of FIG. 3 is presented. Preferably, the model may be used to evaluate the saturation throughput and power consumption (represented by duty cycle) of an exemplary data communication network with star topology, such as that of FIG. 1 or 2.

In the following, section A lists notations and the key assumptions in the model of the present embodiment; Section B presents the outline for calculating system throughput based on the model of the present embodiment; Sections C-E present the details related to the calculation of the system throughput; and Section F presents the calculation of the duty cycle.

A. Notations and Assumptions

TABLE 1

Meaning of notations used

| Parameters | Definition |
|---|---|
| THR | the system throughput |
| $T_{cycle}$ | the duration of a work cycle of a node |
| $T_{hold}$ | the duration when a node holds the channel in a work cycle, i.e. the duration from the instant the node sends the first beacon to the instant the node sends the last beacon in same work cycle |
| $T_{tx}$ | the duration of a data transmission procedure |
| $T_{beacon}$ | the duration when a node sends a beacon |
| $T_{wait}$ | the duration when a node waits before receiving data after sending a beacon |
| $T_{data}$ | the duration when a node receives a data frame or waits for the end of collision |
| $E[T^i]$ | the expected value of duration of the $i^{th}$ transmission procedure in a work cycle |
| $L_{beacon}$ | the length of a beacon frame |
| $L_{data}$ | the length of a data frame |
| $E[B^i]$ | the expected value of successfully received bits of the $i^{th}$ data transmission procedure in a work cycle |
| Rate | data rate |
| μ | the slot time |
| N | the number of surrounding nodes |
| m | the number of transmission procedures in $T_{hold}$ |

Table 1 contains the notations used below for illustrating the model of the present embodiment and their meaning. To facilitate discussion of the model in the present embodiment, the following assumptions are made:

The data communication network includes a star topology with a center node (e.g., sink node) and two or more surrounding nodes. Such a star topology constitutes a performance bottleneck of the whole network, because in RI-MAC, all traffic loads will be finally delivered to a receiver node.

All nodes are arranged in a single cell, wherein each node can hear each other and therefore no hidden and exposed terminal problems.

The data communication network is operated in a saturated operation condition, where the surrounding nodes always have data to the center node (e.g., sink node) while the center node just acts as a receiver. The saturation throughput can be regarded an upper bound of throughput that RI-MAC can sustain.

PHY channel is ideal so that transmission failures are only due to collisions.

The duration of each work cycle of each node is independent and follows an identical uniform distribution, namely, U [a, b]. It should be noted however that the analysis method of the present embodiment is applicable in an arbitrary distribution.

The length of a data frame, the length of a beacon, and the bandwidth are all fixed.

It should once again be noted that these assumptions are made solely to simply discussion and to facilitate description of the model of the present embodiment. In some embodiments of the model of the present invention, some of these assumptions are not necessary.

B. System Saturation Throughput

Since the intended receiver is the initiator of each data transmission in RI-MAC, the model in the present embodiment is built from the perspective of a receiver. In the star topology, the center node is the only intended receiver of all the data transmissions. Thus, unless ambiguity occurs, the receiver in the proposed model, denoted by R, refers to the center node. Each sender in the model, denoted by Si, refers to each of the surrounding nodes in direct connection with the center node, where $i \in [1, N]$. S denotes the collection of senders $S_i$.

In the present embodiment, the system saturation throughput can be calculated within a generic work cycle of R. This is because R operations in multiple work cycles; the work cycles of R are independent identically distributed; and the transmissions in the different work cycles are independent.

Figure 4:
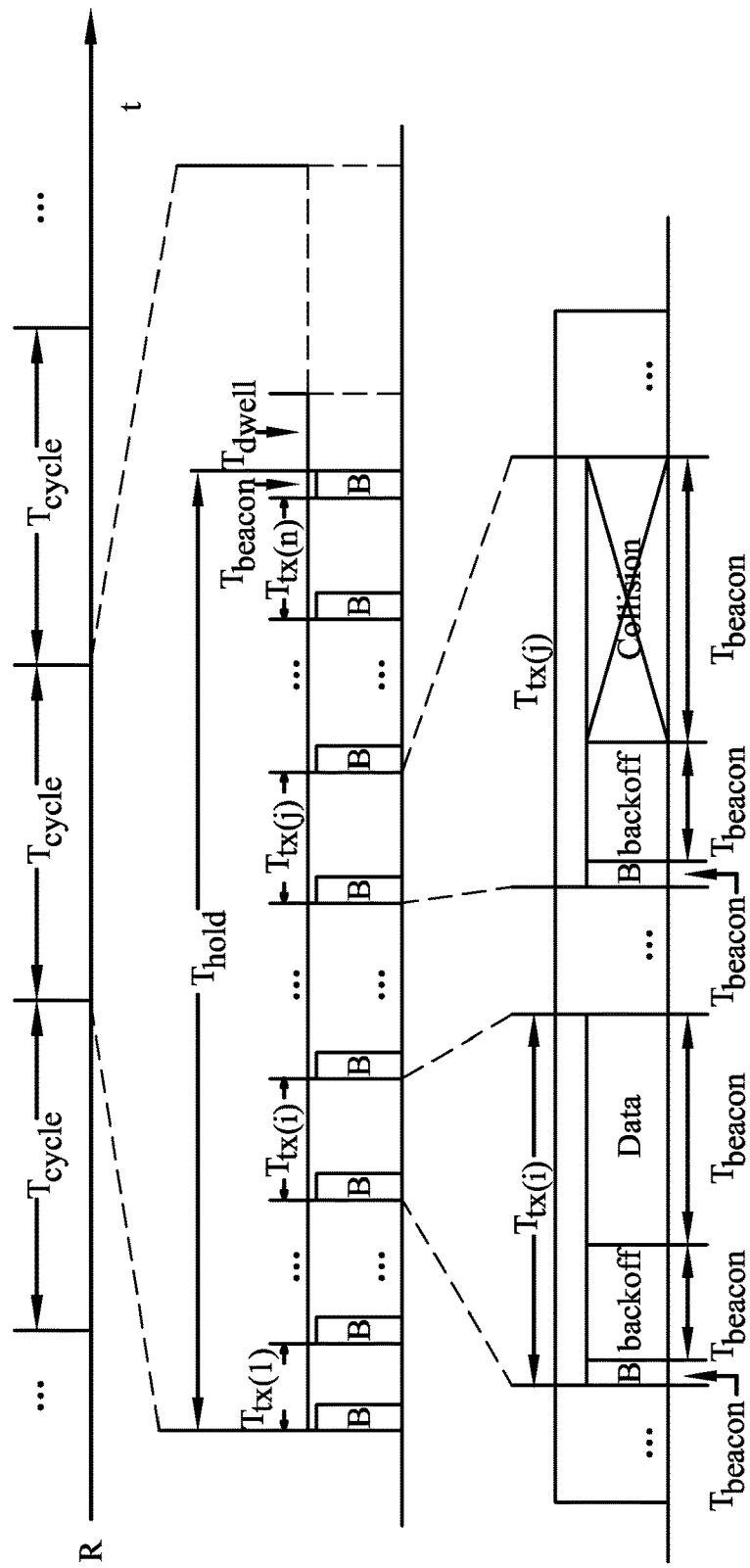
FIG. 4 is a schematic diagram illustrating a work cycle of a receiver in a data communication network such as that of FIG. 1 under the control of a receiver-initiated MAC.

FIG. 4 illustrates a generic work cycle of R. $T_{cycle}$ denotes the duration of a work cycle. THR denotes the normalized system saturation throughput, defined as:

$$THR = E[\#]/E[T_{cycle}] \quad (1)$$

where $E[\#]$ is the expected value of average number of bits successfully received in $T_{cycle}$ and $E[T_{cycle}]$ is an expected value of $T_{cycle}$.

In the present embodiment, $T_{cycle}$ follows the normal distribution U [a, b], and $E[T_{cycle}]$ can be expressed as:

$$E[T_{cycle}] = (a+b)/2 \quad (2)$$

In this embodiment, the calculation of $E[\#]$ most important for calculating the throughput. In one embodiment, the calculation of $E[\#]$ can be divided into three steps. Step (1) involves studying $T_{hold}$, which denotes the length of the duration from the start of the first beacon to the end of the last beacon sent by R in a work cycle. During $T_{hold}$, R is active and it holds the channel to initiate data transmissions. All data transmissions in $T_{cycle}$ occur during $T_{hold}$. $E[\#]$ hence equals the average number of bits successfully received in $T_{hold}$. By studying why R stops sending beacons, the cumulative distribution function (CDF) of $T_{hold}$ can be obtained and then the expected value of $T_{hold}$ (i.e., $E[T_{hold}]$) can be calculated. Step (2) involves studying successive data transmission procedures in a work cycle. A data transmission procedure (also called "data communication event"), defined as the aggregate of all the operations of R to receive a data frame, comprises three parts: (a) R sends a beacon ("beacon transmission event"); (b) R waits for data frame because of the competition among S ("wait even"); and (c) R receives a data frame if the transmission is successful or R waits until the end of a collision if the transmission collides ("data receive or collision event"). Preferably, the data transmission procedures are seamless with each other such that R always sends a beacon immediately after data frame is received successfully or collision ends. A stochastic model, preferably a 1-D Markov chain, is built to model the correlation among transmission procedures. Let $T_{tx}^i$ denote the duration of each transmission procedure and $B^i$ denote the successfully received bits in each transmission procedure, where i is the sequence number of each data transmission procedure and $i \in \{1, 2, 3 \ldots\}$. With the Markov chain, the expected value of each $T_{tx}^i$ (i.e., $E[T_{tx}^i]$) and the expected value of each $B^i$ (i.e., $E[B^i]$) can be obtained. Step (3) involves studying the average number (i.e., n) of data transmission procedures in $T_{hold}$. The value of n corresponding to $E[T_{hold}]$ can be obtained by resolving an equation between $E[T_{hold}]$ and the sum of $E[T_{tx}^i]$. $E[\#]$ can be determined as the sum of $E[B^i]$, where $i \in [1, n]$.

C. The Duration when R Holds the Channel $T_{hold}$ denotes the duration from the beginning of transmission of the first beacon to the end of transmission last beacon by R in a $T_{cycle}$, during which R holds the channel and initiates data transmissions. In the present case, the first beacon is sent immediately when R wakes up. So, $T_{hold}$ starts at the moment when the wakeup instant of R arrives. However, whether a beacon is the last beacon of R in a $T_{cycle}$ cannot be ascertained/predetermined. A beacon is the last beacon of R when R neither receives a data frame nor detects a collision in the dwell time ($T_{dwell}$) of a beacon. In other words, if none of the senders S sends a data frame to R during the dwell time of the beacon, the beacon is the last beacon. In this case, since all of the senders S always have data to be sent to R, the only reason that S do not send any data frame to R is that the schedule wakeup instant of any of the senders S has arrived. In RI-MAC, any of S (e.g., $S_i$) sends a beacon when its scheduled wakeup instant arrives. When the other S senses the beacon over the channel, they immediately terminate the current back-off process to compete for sending data to R. Because the other S do not have data for $S_i$, they keep quiet and wait for another beacon from R. At the same time, R also keeps quiet and waits for a data frame from S. When R receives no data frame in the dwell time, it stops sending beacons in this $T_{cycle}$. Consequently, the last beacon of R must have been sent before the arrival of scheduled wakeup instant of any of S.

In the present embodiment, it is further assumed that $T_{hold}$ ends at the exact moment of the scheduled wakeup instant of any of S.

Figure 5:
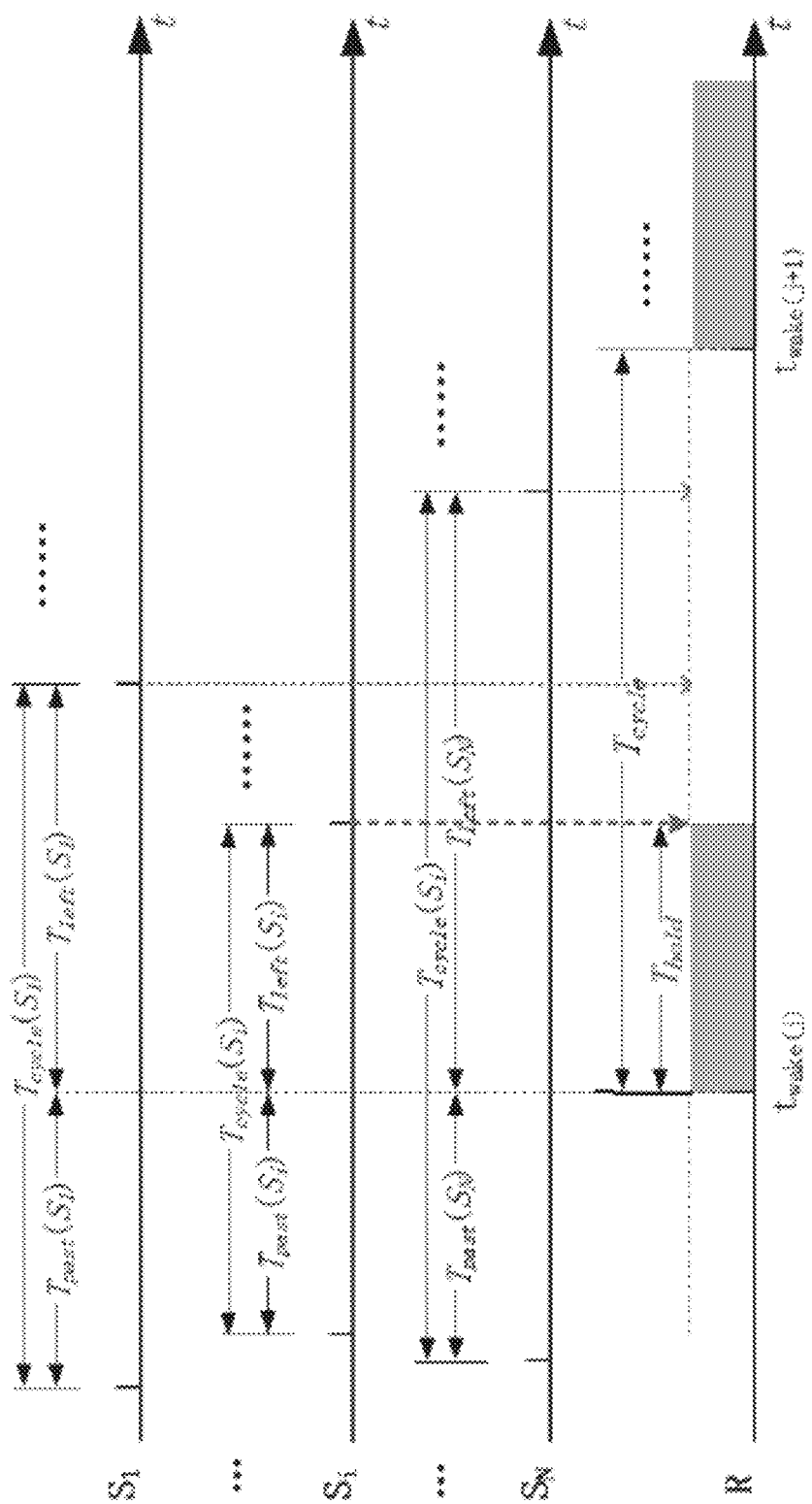
FIG. 5 is a schematic diagram illustrating respective data communication period of a receiver and its neighboring senders in the data communication network such as that of FIG. 1 under the control of a receiver-initiated MAC.

FIG. 5 shows a generic $T_{hold}$ of R. In FIG. 5, $t_{wake(j)}$ represents a generic wakeup instant of R, where j is a positive integer. At the moment $t_{wake(j)}$, each of the senders S is in its own work cycle (i.e., $T(S_i)$). For $S_i$, the duration from the start of $T_{cycle}(S_i)$ to $t_{wake(j)}$ is denoted by $T_{past}(S_i)$, while the time from $t_{wake(j)}$ to the end of $T_{cycle}(S_i)$ is denoted by $T_{left}(S_i)$. Accordingly, $T_{hold}$ equals the minimum value of all the $T_{left}(S_i)$:

$$T_{hold} = \min T_{left}(S_1), \ldots, T_{left}(S_N) \quad (3)$$

In the present embodiment, $T_{past}(S_i)$ follows a uniform distribution from 0 to the total length of current work cycle, $U(0, T_{cycle}(S_i))$. Since $T_{cycle}(S_i)$ follows $U(a, b)$, it can be determined, based on mathematical operation, that $T_{left}(i)$ also follows the same distribution as $T_{past}(S_i)$, namely $U(0, T_{cycle}(S_i))$. Let $T_{left}$ represents any one of $T_{left}(S_i)$ and $T_{cycle}$ represents any one of $T_{cycle}(S_i)$, as every $T_{left}(S_i)$ have the same distribution and every $T_{cycle}(S_i)$ have the same distribution. Let x denotes the length of $T_{left}$, and y denotes the length of $T_{cycle}$, where $x \in [0, b]$, $y \in [a, b]$. Let $f_{left}(x, y)$ represents the joint distribution function of $T_{cycle}$ and $T_{left}$. Accordingly, $f_{left}(x,y)$ can be expressed as:

$$f_{left}(x, y) = \frac{1}{(b-a)y} \quad (4)$$

Let $F_{left}(x)$ denote the cumulative distribution function (CDF) of $T_{left}$ after eliminating y. Then, $$F_{left}(x) = \begin{cases} \int_0^b \int_0^x \frac{1}{(b-a)y} dy\, dx & (0 \leq x \leq a) \\ \int_x^b \int_x^y \frac{1}{(b-a)y} dy\, dx & (a < x \leq b) \end{cases} \quad (5)$$

With $F_{left}(x)$, equation (5) can be substituted into equation (3) and the CDF of $T_{hold}$, i.e. $F_{hold}(x)$, can be obtained:

$$F_{hold}(x) = P(\min\{T_{left}(S_1), \ldots T_{left}(S_N)\} < x) = \quad (6)$$
$$1 - P(\min\{T_{left}(S_1), \ldots T_{left}(S_N)\} > x\}) =$$
$$1 - P(T_{left}(S_1) > x) \ldots P(T_{left}(S_N) > x) = 1 - (1 - F_{left}(x))^N$$

Consequently, the average length of $T_{hold}$ (i.e., $E[T_{hold}]$) can be calculated as follows. In the calculation, let $f_{hold}(x)$ denote the probability density function (PDF) of $T_{hold}$.

$$E[T_{hold}] = \int_0^b x * f_{hold}(x)\, dx = \quad (7)$$
$$\int_0^b x * (F'_{hold}(x))dx = x * F_{hold}(x)\Big|_0^b - \int_0^b F_{hold}(x)dx =$$
$$x * F_{hold}(x)\Big|_0^b - \int_0^b (1 - (1 - F_{left}(x))^N)dx = x * F_{hold}(x)\Big|_0^b - x\Big|_0^b +$$
$$\int_0^b (1 - F_{left}(x))^N dx = \int_0^b (1 - F_{left}(x))^N dx$$

D. Transmission Procedures

Figure 6:
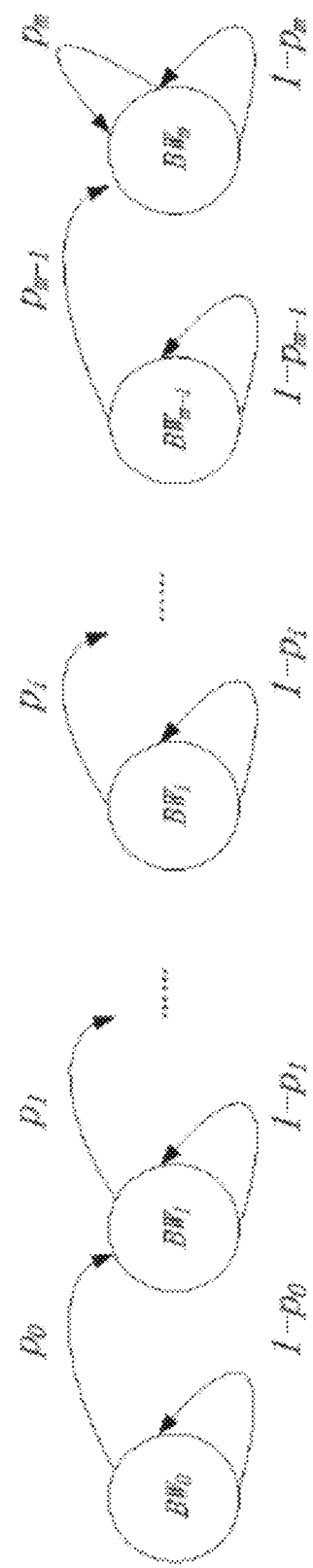
FIG. 6 shows a Markov chain model representing correlation of the data communication events in the work cycle of a receiver in the data communication network such as that of FIG. 1 under the control of a receiver-initiated MAC and based on the model/method of FIG. 3.

A data transmission procedure (data communication event) initiated by R comprises three parts: R sends a beacon (beacon transmission event); R waits for a data frame because of senders' back-off (wait event); and R receives a data frame successfully or waits for the end of collision (data receive or collision event). Let T denote the duration of a data transmission procedure, and $T_{beacon}$, $T_{wait}$, and $T_{data}$ denotes the duration of each of the three parts respectively. In equation form, $$T_{tx} = T_{beacon} + T_{wait} + T_{data} = \quad (8)$$
$$\left(H + \frac{L_{beacon}}{Rate} + SIFS\right) + T_{wait} + \left(H + \frac{L_{MacHeader} + L_{data}}{Rate} + SIFS\right)$$

where H stands for the PHY header, $L_{MacHeader}$ stands for the length of mac header of data frame, and SIFS stands for "Short Inter Frame Space". As $T_{wait}$ is the only variable in equation (8), the focus in this embodiment is on $T_{wait}$. In the present embodiment, $T_{wait}$ relates to the competition among S, which is directed by the BW value in the beacon of R. Here, back-off stages are introduced for convenience and each back-off stage directly relates with BW value. m denotes the max back-off stage, satisfying $BW_{max}+1=2^{m-1}$ ($BW_{min+1}$). Back-off stage i corresponds to that BW value equals $BW_i$, where $i \in [0, m]$. Preferably, the present embodiment uses a 1-D Markov model to model the correlation of BW value in successive data transmission procedures/events. FIG. 6 shows the proposed Markov model with m+1 states. As shown in FIG. 6, each state represents a distinct BW value corresponding to a distinct back-off stage. Note that $p_i$ is the probability of R detecting a collision in state i.

As stated above, BW value of the first beacon in a work cycle is 0, and so that $BW_0=0$. The BW value in the first beacon after a collision is set to $BW_{min}$, so $BW_1=BW_{min}$. Every time when R detects a collision, it doubles BW value, so that $BW_i=2^{i-1}*BW_{min}$, where $i \in 1, 2, \ldots, m$. When the BW value reaches $BW_{max}$, BW value keeps unchanged, so that $BW_m=BW_{max}$.

In the present embodiment, the value of $p_i$ is determined when BW value and the number of surrounding nodes, N, are determined. In this example, R either receives a data frame successfully or detects a collision as all of senders S always have data to send. Only when any one of the senders S (e.g., $S_i$) chooses a back-off window from [0, BW] while the other N−1 senders choose a larger back-off window than $S_i$, R is able to receive a data frame successfully. So, the expression of $p_i$ can be derived by excluding the probability of successful data transmission in a data communication event.

$$P_i = 1 - N \sum_{j=0}^{j=BW_i-1} \left[ \left( \frac{1}{BW_i + 1} \right) \left( \frac{BW_i - j}{BW_i + 1} \right)^{N-1} \right] i \in 0, 1, \ldots m \quad (9)$$

Let W(t) be the stochastic process representing the back-off stage in Markov model. In this example, a discrete and integer time scale is adopted: t and t+1 correspond to the start of two consecutive data transmission procedures in the work cycle of R. The non-null one-step transmission probability in this Markov model can be represented as follows, with the short notation $P\{i|j\}=P\{W(t+1)=i|W(t)=j\}$.

$$\begin{cases} P\{i \mid i\} = 1 - p_i, 0 \le i < m \\ P\{i+1 \mid i\} = p_i, 0 \le i < m \\ p\{m \mid m\} = 1 - p_m + p_m = 1 \end{cases} \quad (10)$$

The first line in equation (10) accounts for the fact that R keeps the back-off stage unchanged if R receives data frame successfully, when R is not in the maximum back-off stage. The second line in equation (10) accounts for the fact that R increases the back-off stage if R detects data frame collision, when R is not in the maximum back-off stage. The third line in equation (10) accounts for the fact that R stays in the maximum back-off stage no matter R receives data frame successfully or R detects a collision, when R is already in the maximum back-off stage.

To simplify the following calculation, a transition matrix Q is built:

$$Q = \begin{bmatrix} 1-p_0 & p_0 & 0 & \ldots & 0 & 0 & \ldots & 0 \\ 0 & 1-p_1 & p_1 & \ldots & 0 & 0 & \ldots & 0 \\ \ldots & \ldots & \ldots & \ldots & \ldots & \ldots & \ldots & \ldots \\ 0 & 0 & 0 & \ldots & 1-p_i & p_i & \ldots & 0 \\ \ldots & \ldots & \ldots & \ldots & \ldots & \ldots & \ldots & \ldots \\ 0 & 0 & 0 & \ldots & 0 & 0 & \ldots & 1 \end{bmatrix} \quad (11)$$

Let the vector $\pi_i = P\{W(t)=0|t=i\}, \ldots, P\{W(t)=m|t=i\}$ denote the probability distribution of back-off stage of the $i^{th}$ beacon of R, where i is an integer number. Since $\pi_1=(1, 0, 0, \ldots, 0)$, it can be derived that $$\pi_i = \pi_1 * Q^{i-1} \quad (12)$$

Let $T_{wait}(BW)$, a function of BW value, denote the expected waiting time when BW value is determined. $T_{wait}(BW)$ is calculated as the expected shortest back-off duration of all the S, which equals the shortest back-off window multiply the slot time. Let $X_i$ denote the back-off window of $S_i$ where $i \in \{1, 2, \ldots, N\}$, and µ denote the slot time. Because $X_i$ follows a uniform distribution from 0 to BW, it can be determined that $$T_{wait}(BW) = E[\min(X_1, X_2, X_3 \ldots X_N)] * \mu = \frac{BW}{N+1} \quad (13)$$

Let vector $T_{wait} = \{T_{wait}(BW_0), \ldots, T_{wait}(BW_m)\}$ denote the expected waiting duration of each back-off stage. As the probability distribution of the back-off stage of the $i^{th}$ beacon of R is known as $\pi_i$, the expected duration of waiting time in the $i^{th}$ transmission procedure of R, denoted by $E[T_{wait}^i]$ where $i \in \{1, 2, \ldots\}$, can be determined using a weighted average method in the present embodiment.

$$E[T_{wait}^i] = \pi_i * (T_{wait})^T \quad (14)$$

With $E[T_{wait}^i]$, the average duration of the $i^{th}$ transmission procedure, denoted by $E[T_{tx}^i]$, can be determined:

$$E[T_{tx}^i] = \pi_i * (T_{wait})^T + 2*H + \frac{L_{MacHeader} + L_{data} + L_{beacon}}{Rate} + 2SIFS \quad (15)$$

Let vector $P_{collision} = \{p_0, p_1, \ldots, p_m\}$ denote the collision probability in each back-off stage. As the length of a data frame in each data transmission procedure is fixed to $L_{data}$, the expected number of bits successfully received in $i^{th}$ transmission procedure, denoted by $E[B^i]$, can be obtained by excluding the collided bits.

$$E[B^i] = L_{data} - \pi_i * (P_{collision})^T * L_{data} \quad (16)$$

E. Number of Transmission Procedures in $T_{hold}$

Let n denote the average number of data transmission procedure in $T_{hold}$. As shown in FIG. 4, $T_{hold}$ consists of several $T_{tx}$ and an extra $T_{beacon}$. To simplify the model, in the present example, an equation of time between $E[T_{hold}]$ and $E[T_{tx}^i]$ is used:

$$E[T_{hold}] = \sum_{i=1}^{n} E[T_{tx}^i] + T_{beacon} \quad (17)$$

It should be noted that n need not always be an integer. Assuming two cases $n^-$ and $n^+$ have the highest probability of the number of transmission and neglecting the other possible value. Let the probability of the case $n^-$ be $p^-$ and the probability of the case $n^+$ be $p^+$. It can be determined that:

$$\begin{cases} n^- * p^- + n^+ * p^+ = n \\ p^- + p^+ = 1 \end{cases} \quad (18)$$

Substituting equation (18) into equation (17), the following can be obtained:

$$E[T_{hold}] = \sum_{i=1}^{n} E[T_{tx}^i] + T_{beacon} = \\ \left( p^- * \sum_{i=1}^{n^-} E[T_{tx}^i] + p^+ * \sum_{i=1}^{n^+} E[T_{tx}^i] \right) + T_{beacon} = \\ \sum_{i=1}^{n} E[T_{tx}^i] + (n - n^-) E[T_{tx}^{n^+}] + T_{beacon} \quad (19)$$

As $E[T^i]$ is positive value, equation (19) can be resolved and a unique n can be determined. By calculating the average bits received in $T_{cycle}$ similar to that of equation (19), and with $E[B^i]$, it can be determined that:

$$E[\#] = \sum_{i=1}^{n} E[B^i] = \qquad (20)$$

$$\left( p^- * \sum_{i=1}^{n^-} E[B^i] + p^+ * \sum_{i=1}^{n^+} E[B^i] \right) = \sum_{i=1}^{n^-} E[B^i] + p^+ * E[B^{n^+}]$$

F. Power Consumption

In the present embodiment, the duty cycle is used as the metric to evaluate the power consumption of each node. In this example, senders S are always active as they always have data to send, and so the duty cycle of S are always 1. As shown in FIG. 4, R is "on" under two circumstances: R is in $T_{hold}$; or R is in the dwell time of the last beacon. Based on the analysis above, n transmission procedure occurs in $T_{hold}$. So, the last beacon is the $(n+1)^{th}$ beacon in the $T_{cycle}$. Thus, the duty cycle of R (i.e., $D_{cycleR}$) can be calculated based on:

$$Dcycle_R = \frac{E[T_{hold}] + E[T_{dwell(n+1)}]}{E[T_{cycle}]} \qquad (21)$$

where $E[T_{dwell}(n+1)]$ denotes the average dwell time of the last beacon. As $E[T_{hold}]$ and $E[T_{cycle}]$ have already been determined, in order to calculate $D_{cycleR}$, only $E[T_{dwell}(n+1)]$ has to be determined. According to the above analysis of the present embodiment, the probability distribution of back-off stage of the $(n+1)^{th}$ beacon of R, $\pi_{n+1}$, can be obtained. Let the vector $T_{dwell} = \{BW_0, BW_1, \ldots, BW_m\}$ denote the dwell time of each back-off stage. Combing $\pi_{n+1}$ and $T_{dwell}$, $E[T_{dwell}(n+1)]$ can be obtained based on:

$$E[T_{dwell(n+1)}] = \pi_{n-1} * (T_{dwell})^T \qquad (22)$$

In embodiments where n is not an integer, equations similar to equations (18) and (19) can be used to calculate $E[T_{dwell}(n+1)]$. Finally, $D_{cycleR}$ can be determined.

Model Validation

To validate the model of the present embodiment, a number of comparisons are performed, as illustrated in FIGS. 7A-11B, wherein theoretical results are compared with simulation results obtained by Network Simulator 2 (NS$_2$). In these examples, network with a star topology is used and it is assumed that the traffic is saturated. Both saturation throughput and power consumption are compared. The values of parameters used in both the proposed model and the simulation are summarized in Table 2.

TABLE 2

Value of parameters in both model and simulations

| Parameters | Value |
| --- | --- |
| Data rate | 250 kbps |
| Hardware preamble | 6 bytes |
| SIFS | 192 us |
| Slot time | 320 us |
| (a, b) | (0.5L, 1.5L) |
| Payload of data packet | 28B |

L is a parameter to control the average duration of a work cycle in RI-MAC. The length of a beacon in this example is fixed to 7B, which is typical length of a beacon with BW field, while the length of beacon in simulation follows the standard provided in Sun, Yanjun, Omer Gurewitz, and David B. Johnson. "*RI-MAC: a receiver-initiated asynchronous duty cycle MAC protocol for dynamic traffic loads in wireless sensor networks.*" In Proceedings of the 6th ACM conference on Embedded network sensor systems, pp. 1-14. ACM, 2008. Four sets of parameters, namely "L=1, $BW_{min}$=31, m=4", "L=0.5, $BW_{min}$=31, m=4", "L=1, $BW_{min}$=63, m=4", "L=1, $BW_{min}$=63, m=2" are utilized, and the number of surrounding nodes, N, is varied from 5 to 50. Each simulation of each parameter set runs 200 s and all the simulation results are averaged over 100 runs.

FIG. 7A is a graph showing theoretical results (line) and simulation results (symbol) of a relationship between the throughput of the data communication network and the number of senders in direct connection with the receiver in the data communication network, obtained using the model/method of FIG. 3; FIG. 7B is a graph showing theoretical results (line) and simulation results (symbol) of a relationship between duty cycle of the receiver in the data communication network and the number of senders in direct connection with the receiver in the data communication network, obtained using the model/method of FIG. 3; and FIG. 7C is a graph showing theoretical results (line) and simulation results (symbol) of a relationship between duty cycle of the senders in direct connection with the receiver in the data communication network and the number of those senders in the data communication network, obtained using the model/method of FIG. 3.

As shown in FIGS. 7A-7C, the theoretical results (line) match the simulation results (symbols) satisfactorily. In particular, FIG. 7A shows that the average error of the system throughput of all cases is lower than $_4$% and the max error is 8% in the case of "N=50, L=1, $BW_{min}$=63, m=4"; FIG. 7B shows that the average error of the duty cycle of the center node of all cases is lower than 5%. The error of duty cycle of the center node in each case is lower than 8%, except for the case "N=50, L=1, $BW_{min}$=31, m=4" in which the error is 16%. FIG. 7C shows that both the average and maximum error of the duty cycle of the surrounding nodes in all cases are less than 2%. It can be seen that the model in the embodiment of the present invention is reasonably accurate in most cases, and only becomes less accurate in a few cases when N is big, e.g. at or around 50. This is not a particular concern because in practice it is uncommon for a wireless sensor network to have as much as 50 nodes around the receiver node.

Performance Evaluation

How each parameter influences the system saturation throughput and duty cycle of RI-MAC is investigated. In this example, data communication network with a star topology is also applied and the traffic in the network is also saturated. The present investigation concerns the effect of the number of surrounding nodes (N), back-off window (BW), and the average length of a work cycle (L). As shown above, since surrounding nodes always have packets to send, the duty cycle of surrounding nodes keep almost stable when one or more parameters change. Thus, the following focuses on the duty cycle of the center node. In the following, for simplicity, duty cycle stands for the duty cycle of the center node, unless otherwise specified.

The Number of Surrounding Nodes, N

Firstly, the influence of the number of surrounding nodes, N, is investigated. As already shown in FIGS. 7A-7C, both saturation throughput and duty cycle monotonously decrease when the number of surrounding nodes increases. The model of the present embodiment can provide a mathematical explanation for this phenomenon. By substituting a=0.5 L and b=1.5 L into equation (5), and let x'*L stand for x. Equation (5) can be rearranged to give:

$$F'_{left}(x') = F_{left}(x) = \tag{23}$$

$$F_{left}(Lx') = \begin{cases} x'\ln 3 & (0 \le x \le 0.5L) \\ -x'\ln(x') + x'\ln(3e/2) - 0.5 & (0.5L < x \le 1.5L) \end{cases}$$

Furthermore, by substituting equation (23) into equation (7), it can be determined that:

$$E[T_{hold}] = \int_0^{1.5\,L}(1-F_{left}(x))^N dLx' = L\int_0^{1.5}(1-F'_{left}(x'))^N dx' \tag{24}$$

Let $f_{hold}(N)$ denote $\int_0^{1.5}(1-F'_{left}(x'))^N dx'$, because N is the only variable in the expression. Therefore, $$E[T_{hold}] = L*f_{hold}(N) \Leftrightarrow E[T_{hold}]/L = f_{hold}(N) \tag{25}$$

From the above it can be seen that $E[T_{hold}]/L$ is only related to N. This means that no matter what the length of work cycle (L) or the value of back-off window (BW) is, the percent of time when the center node is expected to hold channel is fixed.

FIG. 8 is a graph showing a relationship between an expected value of the duration of the active data communication period in the work cycle of the receiver in the data communication network per the average duration of the work cycle and the number of senders in direct connection with the receiver in the data communication network. As shown in FIG. 8, the more the number of surrounding nodes in the network, the lower the percentage of time that the center node would hold the channel.

With this conclusion, the two phenomena shown in the results of FIGS. 7A-7C can be readily explained. The first phenomenon is the saturation throughput decreases with increasing N. Suppose that L is fixed temporarily, $E[T_{hold}]$ decreases as N increases. As less data requires less transmission time, the transmitted data in a work cycle decreases with increasing N. The system has a deceasing throughput with an increase in N, because the throughput is a fraction of data to L and L is fixed. The second phenomenon is that the duty cycle decreases with increasing N. As $E[T_{hold}]/L$ is a component of the duty cycle of the center node, as shown in equation (21), when $E[T_{hold}]/L$ decreases with increasing N, the duty cycle also follows this trend.

The Back-Off Window, BW

The influence of BW, determined by two factors BWmin and m, on saturation throughput and duty cycle is then investigated. In this example, four sets of values of $BW_{min}$ and m, namely "$BW_{min}=15$, m=2", "$BW_{min}=15$, m=4", "$BW_{min}=63$, m=2", "$BW_{min}=63$, m=4" are used. The value of L is fixed at is, and the value of N is varied from 5 to 50.

FIG. 9A is a graph showing theoretical results (line) and simulation results (symbol) of a relationship between throughput of the data communication network and back-off window (number and duration of wait period) associated with the receiver in the data communication network, for different number of senders in direct connection with the receiver in the data communication network, obtained using the model/method of FIG. 3. FIG. 9B is a graph showing theoretical results (line) and simulation results (symbol) a relationship between duty cycle of the receiver of the data communication network and back-off window (number and duration of wait period) associated with the receiver in the data communication network, for different number of senders in direct connection with the receiver in the data communication network, obtained using the model/method of FIG. 3. FIGS. 9A-9B show that the errors between theoretical and simulation are within 6%, thereby verifying that the model in the present embodiment is fairly accurate.

FIG. 9A shows three phenomena: (1) the throughput decreases with the increase of $BW_{min}$ and m in the case N=5 or 10; (2) the throughput increases with the increase of $BW_{min}$ and m in the case N=50; (3) the throughput remains substantially the same with varying $BW_{min}$ and m in the case N=20. For the case N=5 or 10, small $BW_{min}$ and m can handle collision reasonably well. Large $BW_{min}$ and m cause each data transmission procedure to involve a relatively long waiting time. Thus, throughput decreases when N increases. For the case N=50, the transmissions suffer too much collisions when $BW_{min}$ and m are small. The throughput increases with N. For the case N=20, it achieves an optimal balance between collisions and waiting, therefore giving the best performance among the four sets of parameters.

FIG. 9B shows that the duty cycle increases with the increasing $BW_{min}$ and m. This is becuase the fraction of the dwell of the last beacon to L is a component of the duty cycle as shown in equation (21). The dwell time of the last beacon increases when $BW_{min}$ and m increase, as shown in equation (22).

The Average Length of a Work Cycle, L

The influence of the average length of a work cycle, L, is also investigated. In this example, the value of $BW_{min}$ is fixed to 32, and m is fixed to 4.

FIG. 10A is a graph showing theoretical results (line) and simulation results (symbol) of a relationship between throughput of the data communication network and an average duration of a work cycle of the receiver in the data communication network, for different number of senders in direct connection with the receiver in the data communication network, obtained using the model/method of FIG. 3; FIG. 10B is a graph showing theoretical results (line) and simulation results (symbol) of a relationship between duty cycle of the receiver of the data communication network and an average duration of a work cycle of the receiver in the data communication network, for different number of senders in direct connection with the receiver in the data communication network, obtained using the model/method of FIG. 3. The fine-grained comparisons in FIGS. 10A-10B show that the errors between theoretical and simulation are within 6%, thereby verifying that the model in the present embodiment is fairly accurate.

In particular, FIG. 10A shows that when N=5, 10, or 20, the throughput firstly increases rapidly, peaks, then decreases, with increasing L. The throughput tends to be stable only when L is relatively large. On the contrary, when N=50, the throughput increases slowly and tends to be stable (substantially the same) for different values of L.

These phenomena can be explained based on a detailed view of each data transmission procedure, as shown in FIGS. 11A-11B. FIG. 11A is a graph showing a relationship between expected value of a duration of the i-$^{th}$ data communication event in a work cycle of the receiver in the data communication network and the sequence number i of the data communication event, for different number of senders in direct connection with the receiver in the data communication network, obtained using the model/method of FIG. 3; FIG. 11B is a graph showing a relationship between expected value of successfully received bits of the i-$^{th}$ data communication event in a work cycle of the receiver in the data communication network and the sequence number i of the data communication event, for different number of senders in direct connection with the receiver in the data communication network, obtained using the model/method of FIG. 3.

In the present embodiment, each data transmission procedure is controlled by the BW value in beacons. BW value begins at 0 and monotonously increases when collisions occur until BW value reaches $BW_{max}$. In this example, as each data transmission always has a probability to collide, the center node always has a probability to increase BW. Thus, the center node is less probable to suffer from a collision when the sequence number increases. However, at the same time, the center node is expected to wait for a longer period of time to receive a data frame. Thus, both $E[T_{wait}^i]$ and $E[B_i]$ increase with an increasing sequence number, as shown in FIGS. 11A-11B. $E[T_{wait}^i]$ and $E[B_i]$ also tend to be stable with the increasing sequence number. That is because when the sequence number is relatively large, the BW value may have already reached $BW_{max}$ and cannot further increase.

The above may explain the results in FIG. 10A: when N=5, 10, or 20, when L is small, $E[T_{hold}]$ is relatively small, n is also small. $E[B_i]$ of the starting transmission procedures are small due to collisions. In FIG. 10A, the collision is the main factor that influences the throughput before the peak. However, n increases with the increasing L. While $E[B_i]$ increases as sequence number increases, $E[T_{wait}^i]$ increases. The center node has to wait for a certain period of time to receive a data frame. Such waiting becomes the main factor that influences the throughput after the peak. When L is relatively large, many data transmission procedures occur in $T_{hold}$. Both $E[B_i]$ and $E[T_{wait}^i]$ tend to be stable, so that the throughput tends to be stable. On the contrary, in the case N equals 50, the collision is always the main factor that influences the throughput comparing to the waiting. Thus, the throughput increases with L.

FIG. 10B shows that when N is fixed, as N increases, the duty cycle first decreases rapidly and then decreases slowly. That is because duty cycle is influenced by both $T_{hold}/L$ and dwell/L. $T_{hold}/L$ is fixed when N is fixed. Though the dwell time is a variable, the variation in the dwell time is relatively small (i.e., the dwell time is rather stable) compared to the variation of L. Thus, in this example, the dwell time could be regarded as a fixed length for approximation. As a result, the figure of power consumption (duty cycle) is very similar to the figure of a reciprocal function.

The following can explain why the model in the present embodiment becomes less accurate when N is as large as 50: when N=50, the center node is only expected to hold the channel for about 2% of L on average. During this period of time, only a small number of data transmission procedures (data communication events) could occur. The success or failure of data transmission would have significant influence on the overall performance of the system. Thus, in this case, the randomness has a great influence on the accuracy of the proposed model in the present embodiment, as the model uses mostly expected values/average values.

Figure 12:
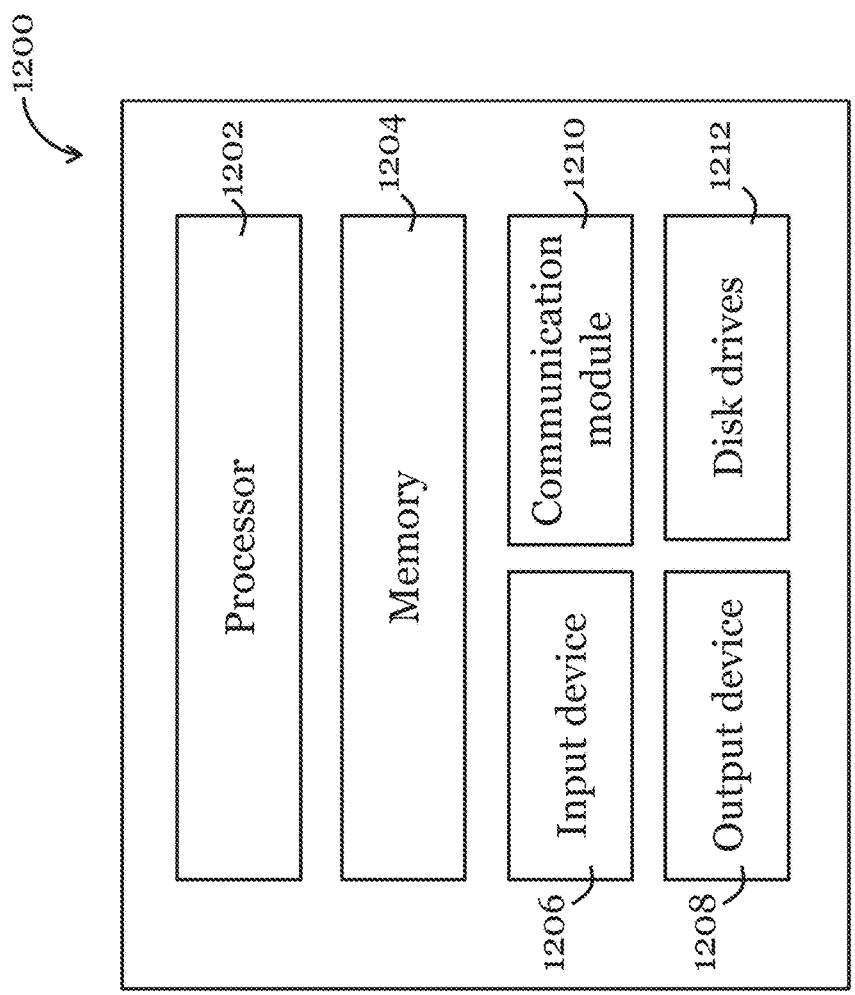
FIG. 12 is a functional block diagram of an information handling system operable to perform the model/method of FIG. 3.

FIGS. 12 shows a schematic diagram of an exemplary information handling system 1200 that can be used as an information handling system for operating the method/model in one embodiment of the present invention. The system may be a computer, a desktop, a laptop, a tablet, a mobile phone, or a dedicated console. Preferably, the system 1200 may have different configurations, and it generally comprises suitable components necessary to receive, store and execute appropriate computer instructions or codes. The main components of the system 1200 are a processing unit 1202 and a memory unit 1204. The processing unit 1202 is a processor such as a CPU, an MCU, etc. The memory unit 1204 may include a volatile memory unit (such as RAM), a non-volatile unit (such as ROM, EPROM, EEPROM and flash memory) or both. Preferably, the system 1200 further includes one or more input devices 1206 such as a keyboard, a mouse, a stylus, a microphone, a tactile input device (e.g., touch sensitive screen) and a video input device (e.g., camera). The system 1200 may further include one or more output devices 1208 such as one or more displays, speakers, disk drives, and printers. The displays may be a liquid crystal display, a light emitting display or any other suitable display that may or may not be touch sensitive. The system 1200 may further include one or more disk drives 1212 which may encompass solid state drives, hard disk drives, optical drives and/or magnetic tape drives. A suitable operating system may be installed in the system 1200, e.g., on the disk drive 1212 or in the memory unit 1204 of the system 1200. The memory unit 1204 and the disk drive 1212 may be operated by the processing unit 1202. The system 1200 also preferably includes a communication module 1210 for establishing one or more communication links (not shown) with one or more other computing devices such as a system, personal computers, terminals, wireless or handheld computing devices. The communication module 1210 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 1202, the memory unit 1204, and optionally the input devices 1206, the output devices 1208, the communication module 1210 and the disk drives 1212 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the system 1200 shown in FIG. 12 is merely exemplary and that different systems 1200 may have different configurations and still be applicable for operating the method/model of the present invention.

The above described embodiments of the method/model of the present invention have provided a brand-new model for RI-MAC from the perspective of a receiver. The model in the present embodiments, through the use of the remaining time method and the 1-D Markov chain, has resolved two critical challenges in modeling of RI-MAC, namely to model the length of time when receivers and senders are active to transmit data due to the duty-cycled nature; and to model the correlation among transmissions initiated by a receiver due to the RI nature.

Embodiments of the method/model of the present invention have, among other things, the following characteristics/advantages:

The proposed model is the first model for any kind of receiver-initiated duty-cycled MACs. It captures the most essential characteristics of RI-MAC, e.g. RI nature and duty-cycled nature. Therefore, it has a wide application scope.

The proposed model can be applied to calculate the system saturation throughput and power consumption of RI-MAC under a star topology. The star topology stands for the last hop around a sink node. It is an essential part of WSN and RI-MAC may meet a throughput bottleneck under such topology. Thus, the calculation is important in practice.

The proposed model is shown to be accurate (based on the comparison of theoretical results and simulation results). The average errors of both system saturation throughput and power consumption are less than 6%.

The proposed model is applicable for investigating how each operation parameter influences the system saturation throughput and power consumption of RI-MAC.

The proposed model helps to provide guidelines for selecting proper parameters for RI-MAC and to provide improvements for RI-MAC.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for evaluating performance of a data communication network with a receiver node arranged to initiate data transmission thereto from a plurality of transmitter nodes directly connected therewith, the method comprising:
   applying a stochastic operation model to the data communication network, wherein the stochastic operation model is arranged to model operation characteristics of the receiver node, the operation characteristics include:
   a duration of a work cycle of the receiver node ($T_{cycle}$), wherein the work cycle includes an active data communication period ($T_{hold}$) and an inactive period ($T_{dwell}$);
   a duration of the active data communication period ($T_{hold}$), wherein the active data communication period includes a number of data communication events;
   the number of data communication events in the work cycle n;
   a duration of the respective data communication events ($T_{tx}$); and
   amount of data successfully received at the receiver node in the work cycle ($B_i$);
   determining throughput or power consumption of the data communication network based on the stochastic operation model.

2. The method in accordance with claim 1, wherein the stochastic operation model is further arranged to model a correlation of the data communication events in a work cycle.

3. The method in accordance with claim 2, wherein the correlation of the data communication events in the work cycle is modeled using a 1-D Markov chain.

4. The method in accordance with claim 2, wherein the data communication events each includes a respective beacon transmission event, a wait event, and a data receive or collision event.

5. The method in accordance with claim 4, wherein a duration of the wait event in a subsequent data communication event is increased compared to a duration of the wait event in an immediately previous data communication event when
   a data collision event occurs in the immediately previous data communication event; and
   the duration of the wait event is below an upper limit.

6. The method in accordance with claim 5, wherein the correlation of the data communication events in a work cycle is associated with a correlation of durations of the wait events in the work cycle.

7. The method in accordance with claim 6, wherein the step of applying the stochastic operation model further comprises the steps of:
   determining an expected value of a duration of the respective data communication events in a work cycle ($E[T_{tx}^i]$); and
   determining an expected value of amount of data successfully received during the respective data communication events ($E[B^i]$).

8. The method in accordance with claim 1, wherein the step of applying the stochastic operation model further comprises the step of
   determining an expected value of a duration of the active data communication period ($E[T_{hold}]$) based on a cumulative distribution function of the duration of the active data communication period ($T_{hold}$).

9. The method in accordance with claim 8, wherein the step of applying the stochastic operation model further comprises the step of
   determining an expected value of the number of data communication events in a work cycle (n) based on the expected value of a duration of the active data communication period ($E[T_{hold}]$).

10. The method in accordance with claim 8, wherein the step of applying the stochastic operation model further comprises the step of
    determining an expected value a duration of the inactive period in a work cycle ($E[T_{dwell(n+1)}]$).

11. The method in accordance with claim 1, wherein the step of applying the stochastic operation model further comprises the step of
    determining an expected value of a duration of a work cycle of the receiver node ($E[T_{cycle}]$).

12. The method in accordance with claim 1, wherein work cycle of each of the receiver node and the transmitter nodes are independent.

13. The method in accordance with claim 1, wherein the receiver node comprises a receiver or a transceiver operating in receiving mode; and the transmitter nodes comprise transmitters or transceivers operating in transmission mode.

14. The method in accordance with claim 1, wherein the receiver node and the plurality of transmitter nodes form a star topology in which data transmission terminates at the receiver node.

15. The method in accordance with claim 1, wherein the data communication network is a wireless sensor network operating under a receiver-initiated medium access control protocol.

16. The method in accordance with claim 1, wherein the throughput is determined by determining $E[\#]/E[T_{cycle}]$;
where $E[\#]$ is an expected value of the amount of data successfully received at the receiver node in the work cycle, determined based on respective amount of data successfully received at the receiver node during respective data communication events in the work cycle; and
$E[T_{cycle}]$ is an expected value of a duration of the work cycle of the receiver node.

17. The method in accordance with claim 1, wherein the power consumption is determined based on duty cycle of the receiver node.

18. The method in accordance with claim 17, wherein the duty cycle of the receiver node is determined by determining $$\frac{E[T_{hold}] + E[T_{dwell(n+1)}]}{E[T_{cycle}]};$$

where $E[T_{hold}]$ is an expected value of the active data communication period in the work cycle;
$E[T_{dwell(n+1)}]$ is an expected value of the inactive period in the work cycle; and
$E[T_{cycle}]$ is an expected value of the duration of the work cycle of the receiver node.

19. A system for evaluating performance for a data communication network with a receiver node arranged to initiate data transmission thereto from a plurality of transmitter nodes directly connected therewith, the system comprising:
means for applying a stochastic operation model to the data communication network, wherein the stochastic operation model is arranged to model operation characteristics of the receiver node, the operation characteristics include:
a duration of a work cycle of the receiver node ($T_{cycle}$), wherein the work cycle includes an active data communication period ($T_{hold}$) and an inactive period ($T_{dwell}$);
a duration of the active data communication period ($T_{hold}$), wherein the active data communication period includes a number of data communication events;
the number of data communication events in the work cycle n;
a duration of the respective data communication events ($T_{tx}$); and
amount of data successfully received at the receiver node in the work cycle ($B_t$);
means for determining throughput or power consumption of the data communication network based on the stochastic operation model.

20. A non-transient computer readable medium for storing computer instructions that, when executed by one or more processors, causes the one or more processors to perform a method for evaluating performance for a data communication network with a receiver node arranged to initiate data transmission thereto from a plurality of transmitter nodes directly connected therewith, the method comprising:
applying a stochastic operation model to the data communication network, wherein the stochastic operation model is arranged to model operation characteristics of the receiver node, the operation characteristics include:
a duration of a work cycle of the receiver node ($T_{cycle}$), wherein the work cycle includes an active data communication period ($T_{hold}$) and an inactive period ($T_{dwell}$);
a duration of the active data communication period ($T_{hold}$), wherein the active data communication period includes a number of data communication events;
the number of data communication events in the work cycle n;
a duration of the respective data communication events ($T_{tx}$); and
amount of data successfully received at the receiver node in the work cycle ($B_t$);
determining throughput or power consumption of the data communication network based on the stochastic operation model.

* * * * *